W. H. SMITH.
NUMBERING MACHINE.
APPLICATION FILED APR. 26, 1909.
965,044.
Patented July 19, 1910.
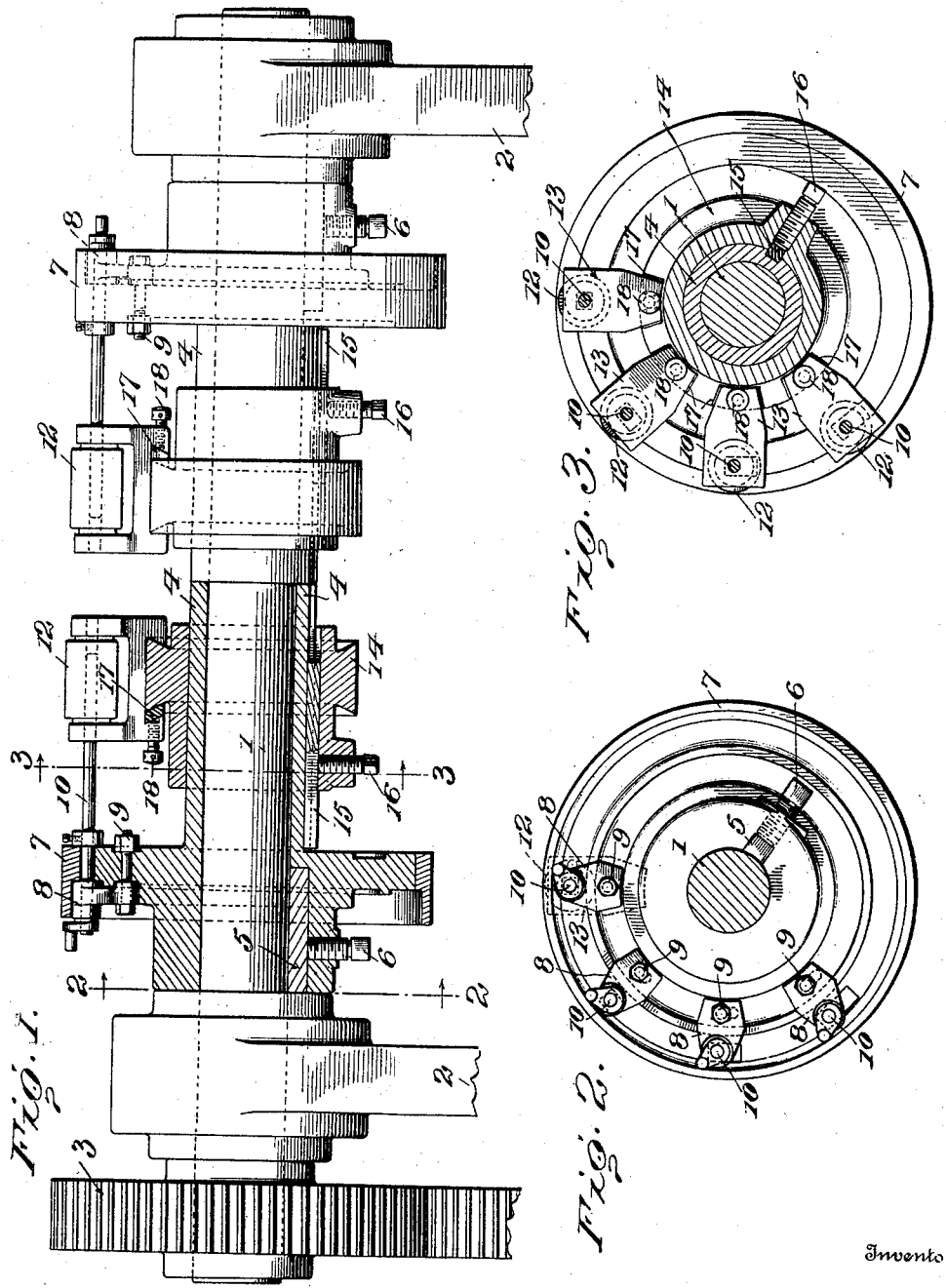
Witnesses
W. A. Williams
Francis S. Magrini
Inventor
Walter H. Smith.
By,
Attorney

UNITED STATES PATENT OFFICE.

WALTER H. SMITH, OF NILES, OHIO, ASSIGNOR TO THE HARRIS AUTOMATIC PRESS COMPANY, OF NILES, OHIO, A CORPORATION OF OHIO.

NUMBERING-MACHINE.

965,044.  Specification of Letters Patent.  Patented July 19, 1910.

Application filed April 26, 1909. Serial No. 492,223.

*To all whom it may concern:*

Be it known that I, WALTER H. SMITH, of Niles, in the county of Trumbull and State of Ohio, have invented certain new and useful Improvements in Numbering-Machines; and I do hereby declare the following to be a full, clear, and exact description of the invention, such as will enable others skilled in the art to which it appertains to make and use the same.

The primary object of this invention is to provide simple and highly efficient means whereby a series of shaft operated numbering heads may be readily adjusted circumferentially of their support; moved longitudinally thereof, and removed and repositioned without the necessity of changing the bearings of their actuating shafts; and also to enable different sets of numbering heads to be differently positioned on a single support.

The invention will be hereinafter fully set forth and particularly pointed out in the claims.

In the accompanying drawings, Figure 1 is a front elevation, partly in section. Figs. 2 and 3 are cross-sectional views on lines 2—2, and 3—3, respectively, Fig. 1.

Referring to the drawings, 1 designates a supporting shaft having its bearings in a frame 2 and carrying a gear wheel 3 which may be driven by any well known means. Upon this shaft are mounted two tubular spindles 4 which are held thereto by grip keys 5 and set screws 6. The spindles 4, near their outer ends have circumferential enlargements forming bearers 7, in the outer faces of which are continuous grooves wherein are located bearings 8 which are frictionally held against the grooved faces of the bearers by nutted bolts 9. These bearings 8 carry the crank-ends of actuating shafts 10 of a series of numbering heads 12, the disks or die wheels of which are operated by the partial turning of such shafts, as is well known in the art. These numbering heads are carried in frames 13 which are circumferentially mounted on disks 14 on spindles 4 to which said disks are held against rotary movement by keys 15 fitting in coincident grooves of the spindle and disks. These keys form part of their respective spindles, but are of less length than the latter so that by releasing set screw 16 a disk may be slid partly over the inner end of the other spindle irrespective of the locations of the two keys 15.

No adjustment of the numbering-head supporting disks longitudinally of their bearing has any effect on the actuating shafts 10, which latter, as customary, have telescoping connections with such heads. The disks 14 are provided with dove-tail flanges to which the frames 13 are secured by means of gibs 17 and set screws 18. By loosening such screws and removing the gibs the several numbering heads may be removed from their respective supporting disks without changing the positions of the bearings of the actuating shafts 10, which latter assist the operator in properly repositioning the numbering heads. To remove all or any of the numbering heads from a disk, the retaining screw 16 is loosened and such disk is moved longitudinally of its support until the numbering heads are free of their actuating shafts. When it is desired to adjust the numbering heads in series, circumferentially of their support, it is necessary to first loosen screw 6.

The advantages of my present invention will be readily understood by those skilled in the art. It is manifest that any desired number of numbering heads may be used, and that it is not necessary for the numbering heads of the two series to be in direct line with each other as is required where a single actuating shaft is common to numbering heads of different series. It will also be seen that either series of numbering heads, together with their shafts, may be readily adjusted circumferentially of their support, and likewise the numbering heads may be moved into different positions longitudinally of their support, and also that when it is desired to remove a numbering head, for the purpose of cleaning or repairing the same, it is not necessary to disturb the actuating shaft thereof, such shaft thereby serving as a guide for repositioning such head.

I claim as my invention:—

1. In a numbering machine, in combination, a shaft, spindles thereon arranged end to end, bearers carried by said spindles, numbering-head supports on said spindles, a series of numbering-heads adjustable circumferentially on each support, and separate independent series of operating shafts for said numbering heads, each series being mounted in one of said bearers.

2. In a numbering machine, in combination, a shaft, spindles thereon arranged end to end, bearers carried by said spindles, numbering-head supports on said spindles, means for permitting said supports to be adjusted longitudinally on said spindles, a series of numbering heads adjustable circumferentially of said supports, and separate independent series of operating shafts for said numbering-heads, each series being mounted in one of said bearers.

3. In a numbering machine, in combination, a shaft, spindles thereon arranged end to end, bearers carried by said spindles at their outer ends, numbering-head supports on said spindles, means for permitting said supports to be adjusted longitudinally of said spindles, a series of numbering-heads adjustable circumferentially of said supports, separate independent series of operating shafts for said numbering-heads, bearings for said shafts mounted on said bearers, and means for detachably securing each numbering-head to its support.

4. In a numbering machine, in combination, a shaft, spindles on said shaft, each spindle having a bearer at its outer end, two series of numbering heads, separate supports therefor mounted on said spindles and adjustable longitudinally thereof, and two series of actuating shafts for said numbering heads, said shafts being mounted in said bearers.

5. In a numbering machine, in combination, a shaft, spindles on said shaft, each spindle having a bearer at its outer end, and also having keys extending longitudinally thereof but short of full lengths of said spindles, two series of numbering heads, separate supports for the latter mounted on said spindles and having grooves for said keys, said supports being adjustable longitudinally of said spindles, and bearings for said actuating shafts mounted in said bearers.

In testimony whereof, I have signed this specification in the presence of two subscribing witnesses.

WALTER H. SMITH.

Witnesses:
FRANCIS S. MAGUIRE,
JOHN A. MURPHY.